(12) United States Patent
Merlin et al.

(10) Patent No.: US 9,071,992 B2
(45) Date of Patent: Jun. 30, 2015

(54) SIGNALING FOR EXTENDED MPDU, A-MPDU AND A-MSDU FRAME FORMATS

(75) Inventors: Simone Merlin, San Diego, CA (US); Maarten Menzo Wentink, Naarden (NL); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 13/205,911

(22) Filed: Aug. 9, 2011

(65) Prior Publication Data

US 2012/0201196 A1    Aug. 9, 2012

Related U.S. Application Data

(60) Provisional application No. 61/372,548, filed on Aug. 11, 2010, provisional application No. 61/374,894, filed on Aug. 18, 2010.

(51) Int. Cl.
    *H04W 4/00*     (2009.01)
    *H04W 28/06*    (2009.01)

(52) U.S. Cl.
    CPC .................................. *H04W 28/065* (2013.01)

(58) Field of Classification Search
None
See application file for complete search history.

(56) References Cited

U.S. PATENT DOCUMENTS

| | | | | |
|---|---|---|---|---|
| 8,229,110 B1 * | 7/2012 | Loc et al. | | 380/28 |
| 2004/0218630 A1 * | 11/2004 | An | | 370/470 |
| 2005/0271031 A1 * | 12/2005 | Cho et al. | | 370/349 |
| 2007/0186134 A1 * | 8/2007 | Singh et al. | | 714/749 |
| 2008/0045153 A1 * | 2/2008 | Surineni et al. | | 455/63.1 |
| 2008/0123260 A1 | 5/2008 | Lo et al. | | |
| 2008/0123620 A1 * | 5/2008 | Ko et al. | | 370/349 |
| 2008/0126320 A1 | 5/2008 | Indeck et al. | | |
| 2009/0031185 A1 * | 1/2009 | Xhafa et al. | | 714/751 |
| 2010/0074277 A1 | 3/2010 | Nishibayashi et al. | | |
| 2010/0315953 A1 * | 12/2010 | Pare et al. | | 370/241 |
| 2011/0134900 A1 * | 6/2011 | Liu et al. | | 370/338 |

FOREIGN PATENT DOCUMENTS

| | | |
|---|---|---|
| CN | 101502072 A | 8/2009 |
| JP | H02196596 A | 8/1990 |

(Continued)

OTHER PUBLICATIONS

Carlos Cordeiro (intel) Et Al"PHY/MAC complete proposal specification—ieee 802.11-10/0433r2", May 20, 2010 XP002664811.*

(Continued)

*Primary Examiner* — Kwang B Yao
*Assistant Examiner* — Hardikkumar Patel
(74) *Attorney, Agent, or Firm* — Dang M. Vo

(57) ABSTRACT

Certain aspects of the present disclosure provide techniques for signaling extended sizes for Medium Access Control (MAC) Protocol Data Unit (MPDU), Aggregated MPDU (A-MPDU) and Aggregated MAC Service Data Unit (A-MSDU) frame formats. A first technique proposes modifications to the current specifications of the IEEE 802.11n standard in order to allow for longer MPDUs in an A-MPDU. This technique reuses the IEEE 802.11n signaling format and utilizes reserved bits to convey the new information. The second technique proposes a new signaling mechanism to convey the extended sizes for the MPDU, A-MPDU and the A-MSDU through a very high throughput (VHT) capability element.

32 Claims, 11 Drawing Sheets

(56) References Cited

FOREIGN PATENT DOCUMENTS

| JP | 2004336748 A | 11/2004 |
| JP | 2008507231 A | 3/2008 |
| JP | 2010050923 A | 3/2010 |
| WO | WO-2006016746 A1 | 2/2006 |
| WO | 2011159831 A1 | 12/2011 |

OTHER PUBLICATIONS

Carlos Cordeiro (intel) Et Al"PHY/MAC complete proposal specification—eee 802.11-10/0433r2", May 20, 2010 XP002664811.*
IEEE, IEEE P802.11ntm/D1.04, Sep. 2006, IEEE.*
Carlos Cordeiro (intel) et al:PHY/MAC Complete Proposal Specification IEEE 802.11-10/0433r2, May 20, 2010, pp. 1-3,19-22,37-38,58-61,111-112,147-149, XP002664811, Retrieved from the Internet: URL:http://www.ieee802.org/II/Reports/tgadupdate.htm [retrieved on Dec. 1, 2011].
International Search Report and Written Opinion—PCT/US2011/047471—ISA/EPO—Dec. 22, 2011.
Partial International Search Report—PCT/US2011/047471—ISA/EPO—Oct. 27, 2011.
Skordoulis D, et al., "IEEE 802.11 n MAC frame aggregation mechanisms for next-generation high-throughput WLANs [medium access control protocols for wireless LANs]" IEEE Wireless Communications, IEEE Service Center, Piscataway, NJ, US, vol. 14, No. 1, Feb. 1, 2008, pp. 40-47, XP011204551 ISSN: 1536-1284.
Working Group of the 802 Committee: Draft IEEE P802.11n(TM) /D2.02—Part 11: Wireless Lan Medium Access Control (MAC)and Physical Layer (PHY) specifications:Amendment 4(# 933): Enhancements for HigherThroughput, IEEE 802.11N/D2.02; 11-07-0597-00-000N-TGN-D202-W0RD-C0NVERSI0 N, May 3, 2007, pp. 2,119-123, XP002664859.
Haugdahl J.S, Inside 802.11 n. Wireless LANs; Practical Insights and Analysis, A Bitcricket White Paper; Dec. 2007, pp. 1-16.
Taiwan Search Report—TW100128755—TIPO—May 2, 2014.
Wang, Jia-Yuan, "On the Performance of Contention-Based Channel Access in IEEE 802.11e", p. 15.
European Search Report—EP13005313—Search Authority—Munich—Feb. 14, 2014.
Stacey R., et al., "A-MPDU Delimiter Changes—IEEE 802.11-10/1093r0," Sep 12, 2010, XP05513707.

* cited by examiner

| A-MSDU length | Corresponding MPDU length |
|---|---|
| 3839 | 4095 |
| 7935 | 8191 |
| 11194 (or 11450) | 11450 |
| 16127 | 16384 |

FIG. 7

| Maximum A-MPDU Length Exponent 3 bits (0-7) | Maximum A-MSDU Length 2 bits (0-3) |
|---|---|

- 902 (Maximum A-MPDU Length Exponent)
- 904 (Maximum A-MSDU Length)

0: 8 kB
1: 16 kB
2: 32 kB
3: 64 kB
4: 128 kB
5: 256 kB
6: 512 kB
7: 1024 kB
$(=2^{13+i})$

0: 3839 Bytes
1: 7935 Bytes
2: 11195 Bytes
(3: 16127 Bytes)

FIG. 9

| 1002 | 904 |
|---|---|
| Maximum A-MPDU Length 3 bits (0-7) | Maximum A-MSDU Length 2 bits (0-3) |

0: 8 kB
1: 16 kB
2: 32 kB
3: 64 kB
4: 128 kB
5: 256 kB
6: 512 kB
7: 1024 kB

0: 3839 Bytes
1: 7935 Bytes
2: 11195 Bytes
(3: 16127 Bytes)

FIG. 10A

| 1002 | 904 |
|---|---|
| Maximum A-MPDU Length 3 bits (0-7) | Maximum A-MSDU Length 2 bits (0-3) |

0: 8 kB
1: 16 kB
2: 32 kB
3: 64 kB
4: 128 kB
5: 256 kB
6: 512 kB
7: 716 kB

0: 3839 Bytes
1: 7935 Bytes
2: 11195 Bytes
(3: 16127 Bytes)

FIG. 10B

SIGNALING FOR EXTENDED MPDU, A-MPDU AND A-MSDU FRAME FORMATS

CLAIM OF PRIORITY UNDER 35 U.S.C. §119

The present Application for Patent claims priority to U.S. Provisional Application No. 61/372,548, entitled, "Signaling for Extended MPDU, A-MPDU and A-MSDU Frame Formats," filed Aug. 11, 2010; and U.S. Provisional Application No. 61/374,894, entitled, "Signaling for Extended MPDU, A-MPDU and A-MSDU Frame Formats," filed Aug. 18, 2010; and assigned to the assignee hereof and hereby expressly incorporated by reference herein.

TECHNICAL FIELD

Certain aspects of the present disclosure generally relate to wireless communications and, more particularly, to signaling information regarding Medium Access Control (MAC) Protocol Data Unit (MPDU), Aggregated MPDU (A-MPDU), or Aggregated MAC Service Data Unit (A-MSDU) frame formats.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S <= \min\{N_T, N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink and downlink directions.

SUMMARY

Certain aspects of the present disclosure provide a method for wireless communications. The method generally includes generating a frame comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than or equal to 4095 bytes, the maximum A-MPDU length comprises a value greater than 64 kilobytes and the maximum A-MSDU length comprises a value greater than 7935 bytes, and transmitting the frame.

Certain aspects of the present disclosure provide a method for wireless communications. The method generally includes generating a frame comprising a group of one or more subframes for a single transmission, wherein at least one of the subframes comprises an indication of a length of the at least one of the subframes and wherein the indication comprises more than 12 bits, and transmitting the frame.

Certain aspects of the present disclosure provide an apparatus for wireless communications. The apparatus generally includes a circuit configured to generate a frame comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than or equal to 4095 bytes, the maximum A-MPDU length comprises a value greater than 64 kilobytes and the maximum A-MSDU length comprises a value greater than 7935 bytes, and a transmitter configured to transmit the frame.

Certain aspects of the present disclosure provide an apparatus for wireless communications. The apparatus generally includes a circuit configured to generate a frame comprising a group of one or more subframes for a single transmission, wherein at least one of the subframes comprises an indication of a length of the at least one of the subframes and wherein the indication comprises more than 12 bits, and a transmitter configured to transmit the frame.

Certain aspects of the present disclosure provide an apparatus for wireless communications. The apparatus generally includes means for generating a frame comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than or equal to 4095 bytes, the maximum A-MPDU length comprises a value greater than 64 kilobytes and the maximum A-MSDU length comprises a value greater than 7935 bytes, and means for transmitting the frame.

Certain aspects of the present disclosure provide an apparatus for wireless communications. The apparatus generally includes means for generating a frame comprising a group of one or more subframes for a single transmission, wherein at least one of the subframes comprises an indication of a length of the at least one of the subframes and wherein the indication comprises more than 12 bits, and means for transmitting the frame.

Certain aspects of the present disclosure provide a computer-program product for wireless communications. The computer-program product typically includes a computer-readable medium having instructions executable for generating a frame comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than or equal to 4095 bytes, the maximum A-MPDU length comprises a value greater than 64 kilobytes and the maximum A-MSDU length comprises a value greater than 7935 bytes, and for transmitting the frame.

Certain aspects of the present disclosure provide a computer-program product for wireless communications. The computer-program product typically includes a computer-readable medium having instructions executable for generating a frame comprising a group of one or more subframes for a single transmission, wherein at least one of the subframes comprises an indication of a length of the at least one of the subframes and wherein the indication comprises more than 12 bits, and for transmitting the frame.

Certain aspects provide an access point for wireless communications. The access point generally includes at least one antenna, a circuit configured to generate a frame comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than or equal to 4095 bytes, the maximum A-MPDU length comprises a value greater than 64 kilobytes and the maximum A-MSDU length comprises a value greater than 7935 bytes, and a transmitter configured to transmit the frame via the at least one antenna.

Certain aspects provide an access point for wireless communications. The access point generally includes at least one antenna, a circuit configured to generate generating a frame comprising a group of one or more subframes for a single transmission, wherein at least one of the subframes comprises an indication of a length of the at least one of the subframes and wherein the indication comprises more than 12 bits, and a transmitter configured to transmit the frame via the at least one antenna.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example relationship between maximum MPDU length values and aggregated MAC Service Data Unit (A-MSDU) length values, in accordance with certain aspects of the present disclosure.

FIG. 9 illustrates a frames length field in a VHT capability element, in accordance with certain aspects of the present disclosure.

FIGS. 10A and 10B illustrate two example frames length fields in a VHT capability element, in accordance with certain aspects of the present disclosure.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
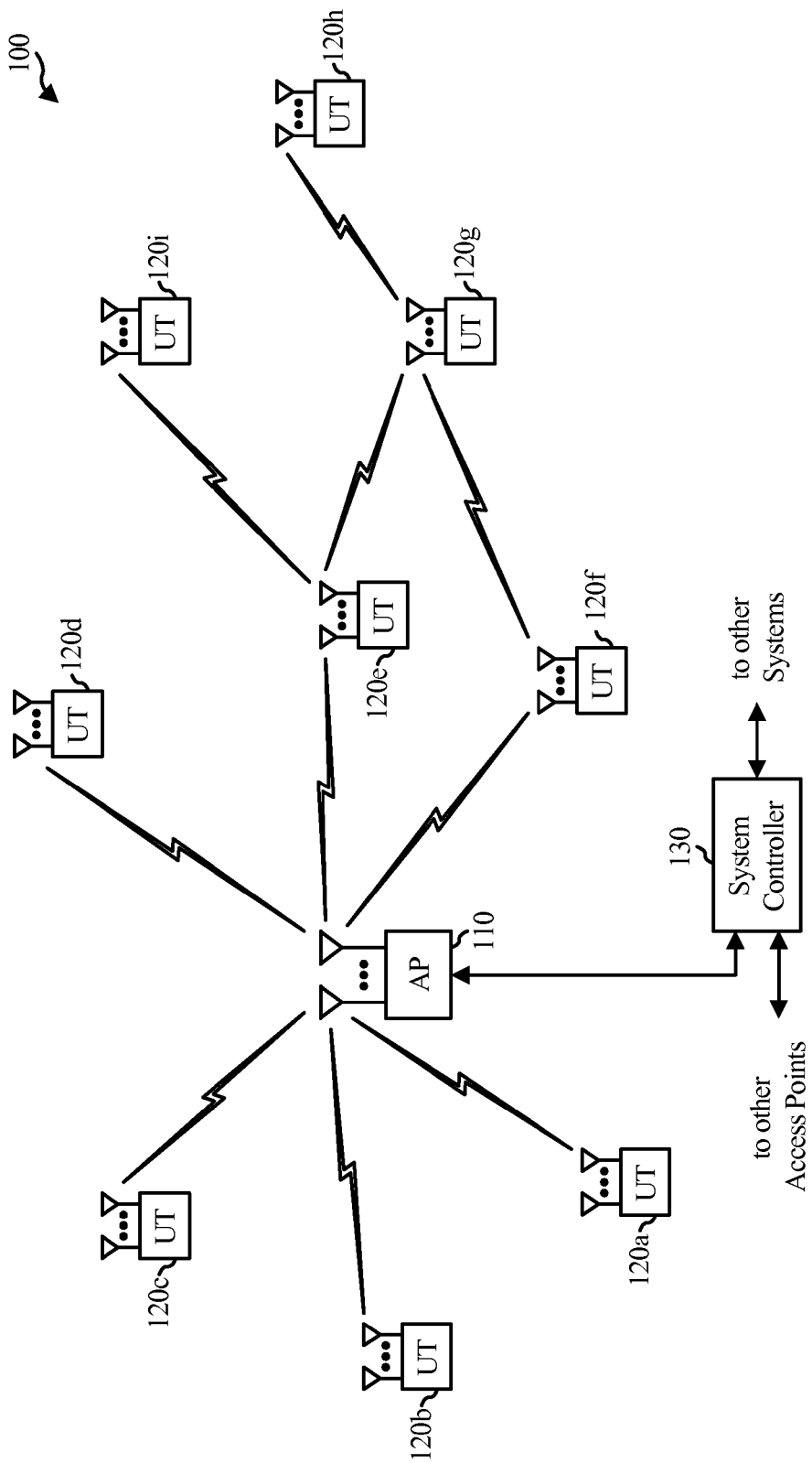
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
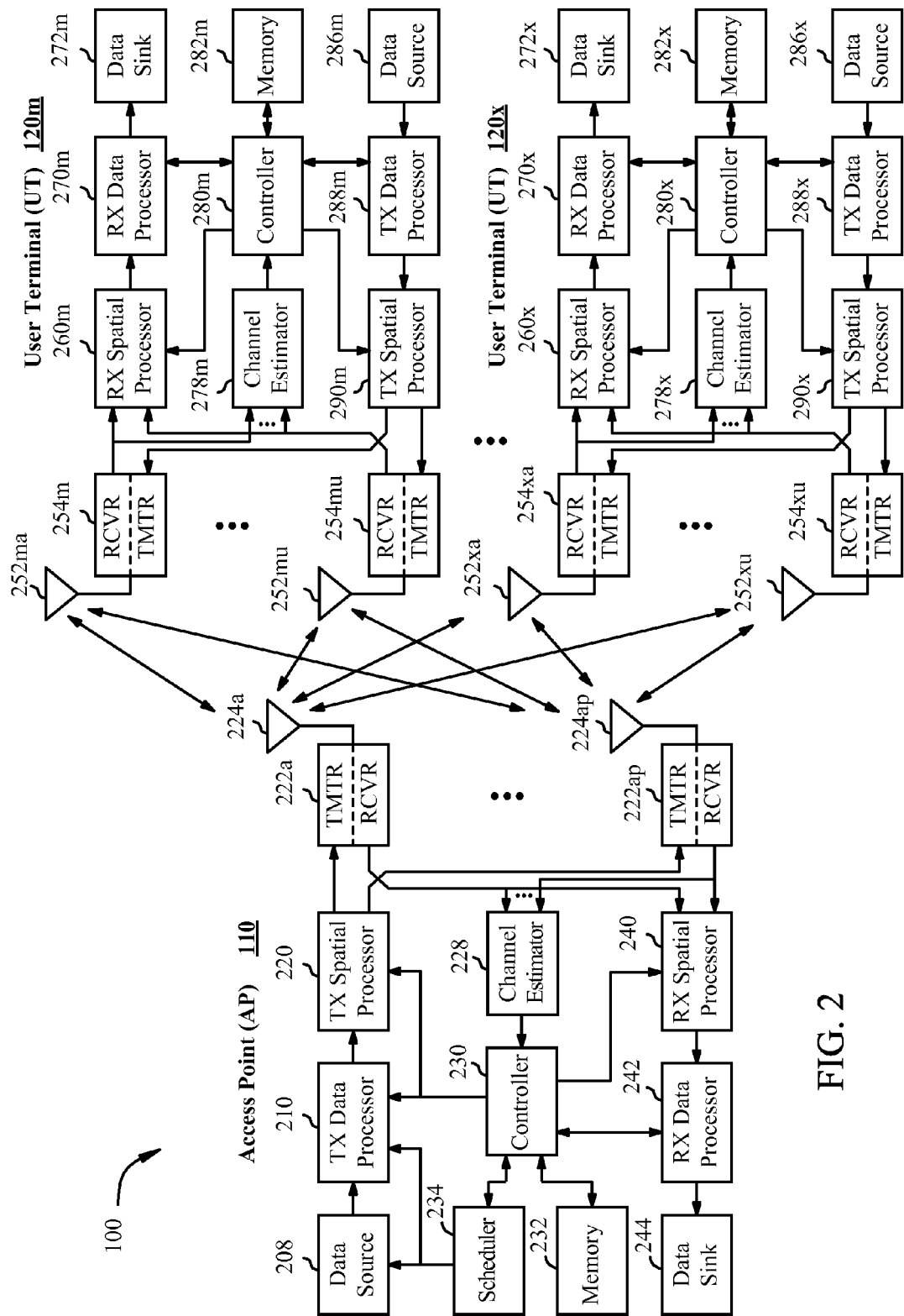
FIG. 2 illustrates a block diagram of an example access point and user terminals, in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
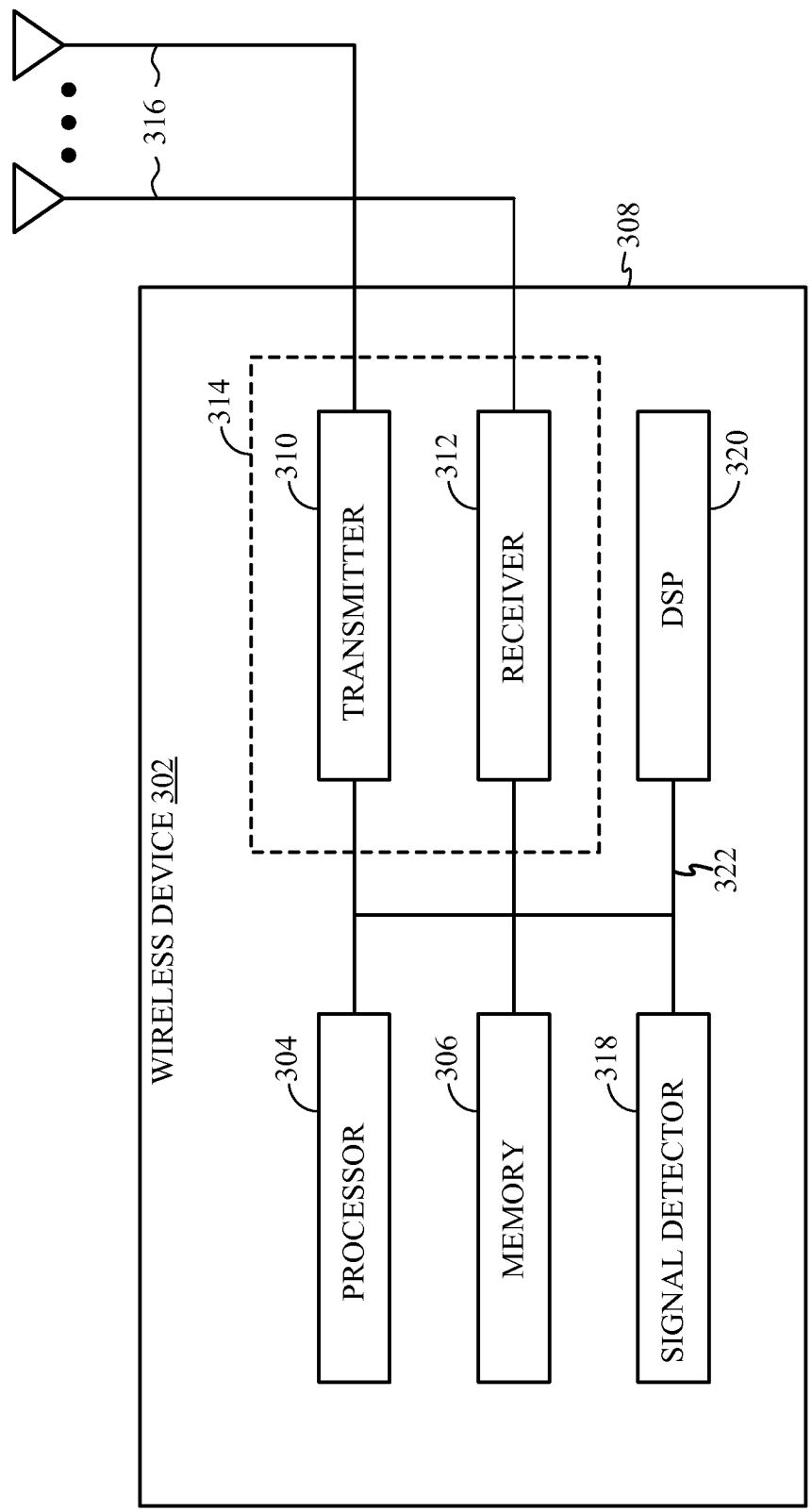
FIG. 3 illustrates a block diagram of an example wireless device, in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA, and combinations thereof.

Certain aspects of the present disclosure provide techniques for signaling extended sizes for Medium Access Control (MAC) Protocol Data Unit (MPDU), Aggregated MPDU (A-MPDU) and Aggregated MAC Service Data Unit (A-MSDU) frame formats. A first technique proposes modifications to the current specifications of the IEEE 802.11n standard in order to allow for longer MPDUs in an A-MPDU. This technique reuses the IEEE 802.11n signaling format and utilizes reserved bits to convey the new information. The second technique proposes a new signaling mechanism to convey the extended sizes for the MPDU, A-MPDU and the A-MSDU through a very high throughput (VHT) capability element.

Certain aspects of the present disclosure may utilize a A-MPDU subframe delimiter to signal length of an MPDU. The MPDU length may be signaled as a negotiation parameter. In addition, current A-MSDU and A-MPDU sizes may be extended and the receiver may be notified of the new sizes by a special signaling mechanism.

Increasing length of MPDUs in an A-MPDU by one or two bits may allow for longer aggregates (e.g., A-MPDUs), while preserving the block acknowledgement (BA) mechanism in the IEEE 802.11n standard. For example, one additional bit in a MPDU may increase the maximum size of MPDUs to 8K, which may result in A-MPDUs with maximum size of 512 Kilo Bytes (KB). For example, in a system with four spatial streams, 80 MHz transmission, 64 quadrature amplitude modulation (QAM) and code rate equal to 5/6, transmission time may be equal to 3.6 milliseconds (e.g., $64 \times 8k \times 8/(4 \times 5 \times 234) \times 4e-6=3.6$ ms). For higher data rates, maximum duration may be shorter. As an example, two extra bits in a MPDU may result in MPDUs with maximum size of 16K, which may result in A-MPDUs with maximum size of 1 Mbyte, which in turn may allow for longer physical layer protocol data units (PPDUs).

Performance (e.g., Hamming distance) of a cyclic redundancy check (CRC) code may be preserved for packet lengths of up to 11450 bytes. For longer packets, Hamming distance may be lower. Therefore, by utilizing a negotiable maximum MPDU length which limits the maximum MPDU size to 11450 octets, effectiveness of the CRC codes may be preserved.

In some scenarios, the MPDUs may be filled with A-MSDUs. Maximum A-MSDU size is already negotiable in the IEEE 802.11n standard, but a third size may be added to the possible A-MSDU sizes if the MPDU length field is increased by two bits. On the other hand, maximum MSDU size is not related to the aggregation efficiency because the A-MSDU may already allow reaching the desired level of aggregation.

Currently, the following lengths are defined in the IEEE 802.11n standard for MPDUs, A-MSDUs and A-MPDUs: Maximum MPDU length equal to 4095 bytes, negotiable A-MSDU lengths of 3839 or 7935 bytes, negotiable A-MPDU lengths of 8, 16, 32, 64 KB. For certain aspects, maximum MPDU length may be increased to 8191, 11450 or 16384 bytes, maximum A-MSDU length may be increased to 11450 (or 11195), 16127, or 15871 bytes, and maximum A-MPDU length may be increased to 128, 256, 512, or 1024 KB.

For certain aspects, the proposed values for the MSDU, MPDU, A-MPDU and A-MSDU may be negotiable in order to enable backward compatibility. Negotiable sizes may also result in implementations with different capabilities.

For certain aspects, size of the MSDUs may be increased to support jumbo frames. However, it may not be necessary to increase size of the MSDUs in order to achieve better aggregation, since A-MSDUs can already be used for aggregation. For certain aspects, the maximum MSDU length may include 2304 or 9000 bytes and may be negotiable.

Figure 4:
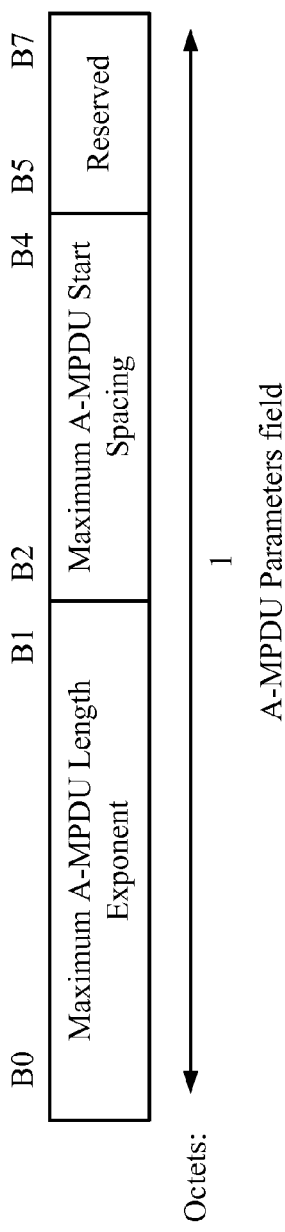
FIG. 4 illustrates an aggregated medium access control (MAC) protocol data unit (A-MPDU) parameters field in the high throughput (HT) capability element in the Institute of Electrical and Electronics Engineers (IEEE) 802.11n standard.

For certain aspects, a negotiable maximum A-MPDU length exponent may range from 0 to 7 to support up to eight different sizes such as the sizes that were previously supported in the IEEE 802.11n standard, in addition to the new proposed sizes (e.g., 128, 256, 512, 1024 KB). FIG. 4 illustrates an A-MPDU parameters field in the high throughput (HT) capability element in the IEEE 802.11n standard. As illustrated, some of the reserved bits (e.g., bits B5-B7) may be used to signal new sizes for the maximum A-MPDU length. The maximum A-MPDU length exponent may be augmented by utilizing a reserved bit from the A-MPDU parameter field in the HT capability element (such as B5), as a most significant bit (MSB) of the maximum A-MPDU length exponent to support up to eight different sizes.

Figure 5:
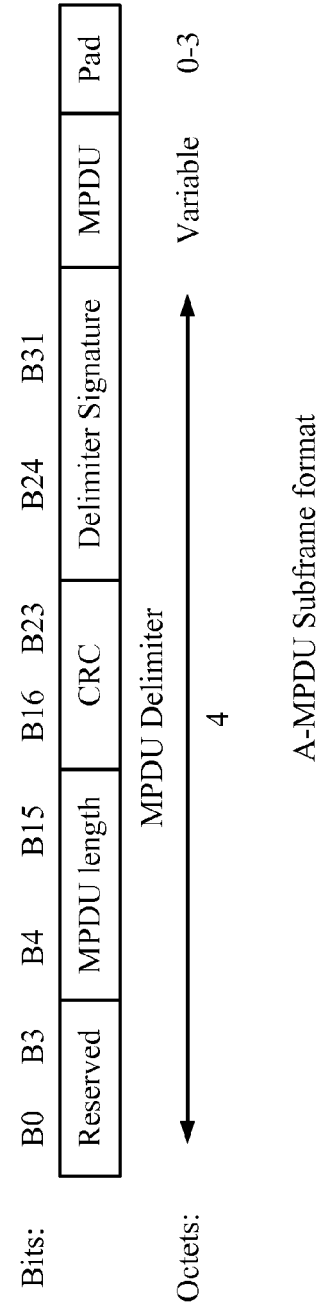
FIG. 5 illustrates an A-MPDU subframe format in the IEEE 802.11n standard.

FIG. 5 illustrates an A-MPDU subframe format in the IEEE 802.11n standard. As illustrated, a MPDU delimiter may include several fields, such as MPDU length, CRC, delimiter signature and some reserved bits. The A-MPDU subframe may include the MPDU delimiter, MPDU, pad and other fields. For certain aspects, two bits may be added to the MPDU delimiter in a A-MPDU subframe length indication, for example as MSBs (e.g., in the B2 and B3 positions). It should be noted that either of the bits B2 or B3 could be the MSB of the new, extended MPDU delimiter.

As an example, an existing MPDU delimiter field in the IEEE 802.11n standard utilizes 12 bits to transmit size of the A-MPDU subframe. For certain aspects, one or more bits may be added to the MPDU delimiter field to be able to indicate larger MPDU sizes (e.g., adding two additional bits to the MPDU delimiter may result in a 14-bit MPDU delimiter field that supports MPDU sizes from 0 to 16383 bits). For certain aspects, the additional bits may represent MSBs of the MPDU delimiter but may be located in a least significant bit (LSB) location of the MPDU delimiter field.

Figure 6:
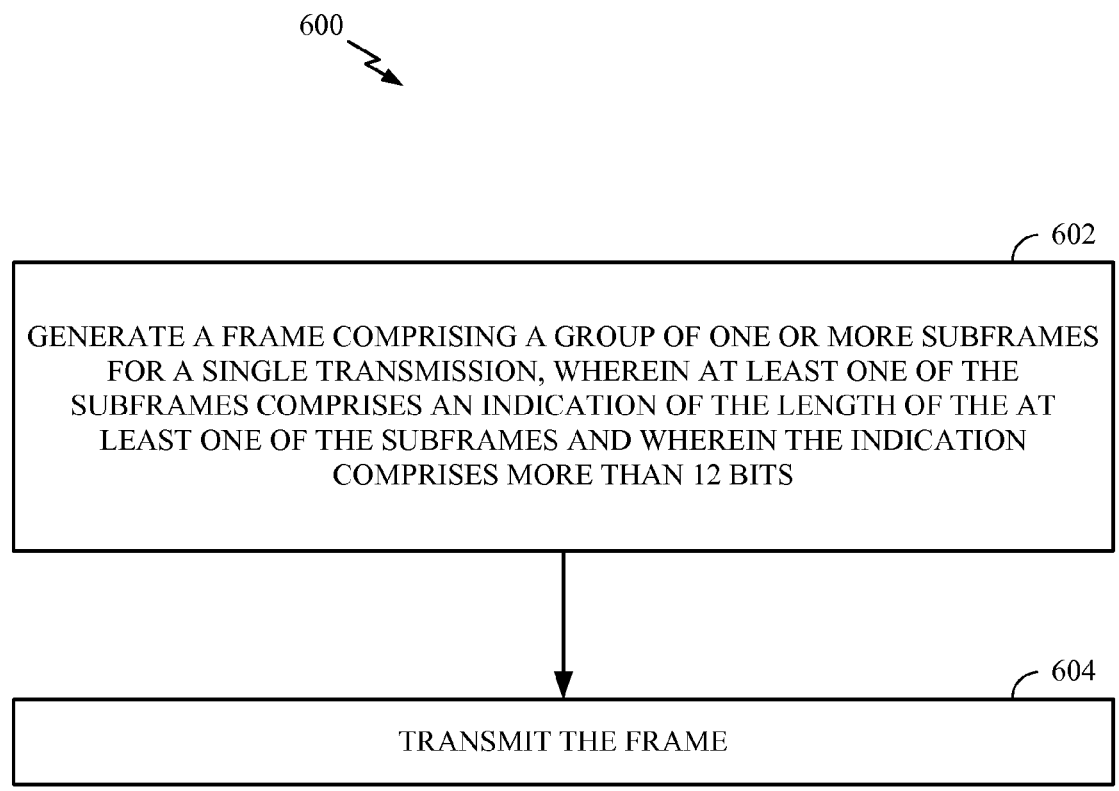
FIG. 6 illustrates example operations for signaling size of a frame that may be performed by a wireless node (e.g., an access point), in accordance with certain aspects of the present disclosure.

FIG. 6 illustrates example operations 600 for signaling size of a frame that may be performed by a wireless node (e.g., an access point), in accordance with certain aspects of the present disclosure. At 602, the wireless node generates a frame comprising a group of one or more subframes for a single transmission, wherein at least one of the subframes comprises an indication of the length of the at least one of the subframes and wherein the indication comprises more than 12 bits. For certain aspects, the frame may be an A-MPDU frame and the subframes may be A-MPDU subframes. For certain aspects, the indication may be expressed in a delimiter field (e.g., MPDU delimiter) that may include one or more additional bits over 12 bits. At 604, the wireless node transmits the frame.

For certain aspects, negotiable maximum MPDU length values (e.g., 4095, 8191, 11450 Bytes) may be defined by adding a Maximum MPDU length subfield in the A-MPDU parameters field. As an example, the Maximum MPDU length may be indicated by using two bits as follows: 00=4095; 01=8191; 10=11450; 11=16383.

For another aspect, negotiable maximum MPDU length values may be defined in the A-MPDU parameter field, which is included in the HT capability element. For example, two reserved bits such as B6 and B7 may be used to indicate 00=3839; 01=7935; 02=11194; 03=16384.

For certain aspects, negotiable maximum MPDU length values may also be derived based on the A-MSDU length with a predetermined, one to one relationship as illustrated in the table in FIG. 7.

FIG. 7 illustrates an example relationship between maximum MPDU length values and A-MSDU values. As illustrated in the table, each A-MSDU length may correspond to a maximum MPDU length. For certain aspects, if the negotiable maximum MPDU length values are defined as in the FIG. 7, one of the reserved bits (e.g., B6) in A-MPDU parameter field may be used to indicate the maximum MSDU length (e.g., B6=0→2304 bytes, B6=1→9000 bytes).

For certain aspects, negotiable maximum A-MSDU length values including the current values (e.g., 3839, 7935), and the proposed new values (e.g., 11194 (or 11450), 16127, or 15871 Bytes may be defined by using a reserved bit (e.g., B13) in the HT-capabilities info field as an MSB for the maximum A-MSDU length.

For another aspect, a new very high throughput (VHT) capability element may be defined that may include indication of maximum MSDU, A-MSDU, MPDU and A-MPDU lengths. The new capability element may be defined by using an element identification (ID) that is not used by previous specifications (e.g., 75). The new capability element may include one or more of the newly proposed fields, such as maximum A-MPDU length exponent (or maximum A-MPDU length), maximum A-MSDU length and maximum MSDU length.

For certain aspects, the element ID that refers to HT capabilities (e.g., 45) may be reused to indicate a modified, different length in the length field (currently 26), corresponding to a frame which includes one or more of the proposed new fields such as maximum A-MPDU length exponent (or maximum A-MPDU length), maximum A-MSDU length, and maximum MSDU length.

Figure 8:
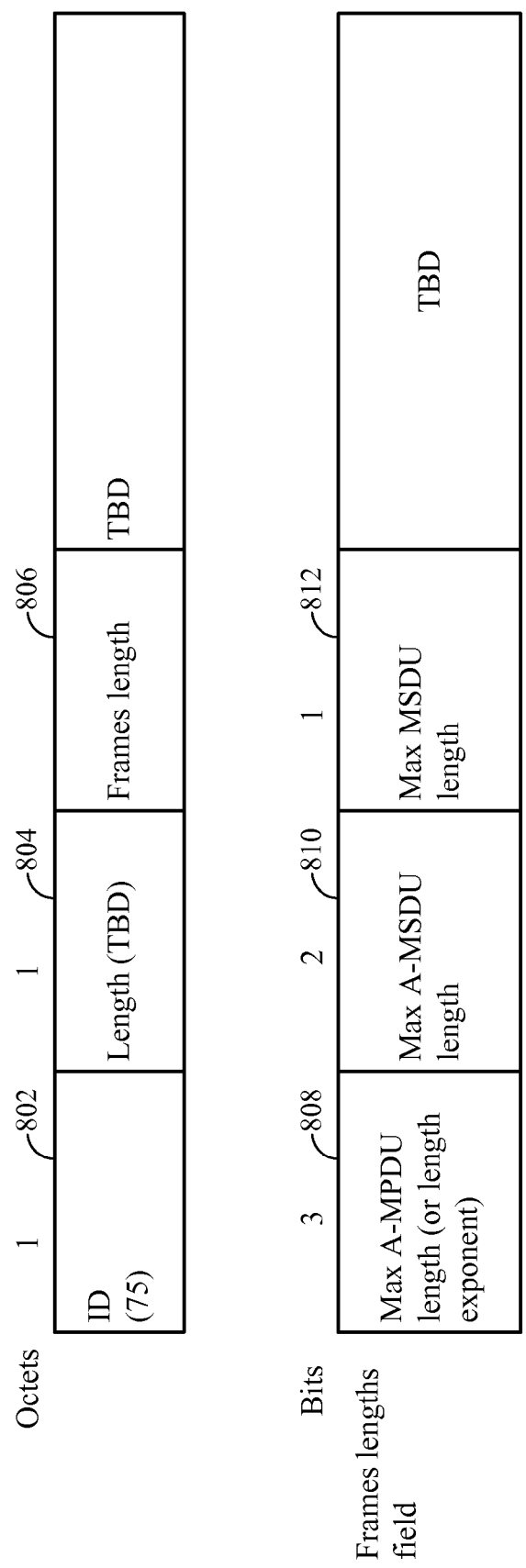
FIG. 8 illustrates a proposed very high throughput (VHT) capability element, in accordance with certain aspects of the present disclosure.

FIG. 8 illustrates a proposed VHT capability element, in accordance with certain aspects of the present disclosure. The proposed VHT capability element may include an identification field 802, a length field 804, a frames length field 806, and other fields. The frames length field 806 may include one or more of the following fields: a maximum A-MPDU length exponent field 808, a maximum A-MSDU length field 810, a maximum MSDU length 812, and other fields. The proposed VHT capability element may specify one or more capabilities specifically related to VHT (IEEE 802.11ac). For example, the Maximum A-MPDU Length Exponent and the Maximum A-MSDU Length may be included as a capability. The maximum MPDU length may be limited to 11450 Bytes to ensure effectiveness of the CRC codes.

FIG. 9 illustrates a frames length field 806 containing a maximum A-MPDU length exponent field 902 and a maximum A-MSDU length field 904 in a VHT capability element, in accordance with certain aspects of the present disclosure. The maximum A-MPDU length exponent field 902 may include three bits to accommodate eight different values (e.g., 0, 1, . . . , 7) corresponding to the maximum A-MPDU lengths of $2^{(13+maximum\ A-MPDU\ length\ exponent)}$ KB. The maximum A-MSDU length field 904 may include two bits to accommodate four values (e.g., 0→3839, 1→7935, 2→11195, 3→16127).

FIGS. 10A and 10B illustrate two example frames length fields 806 containing a maximum A-MPDU length field 1002 and a maximum A-MSDU length field 904 in a VHT capability element, in accordance with certain aspects of the present disclosure. In FIG. 10A, the maximum A-MPDU length field is defined to accept eight different values such as 0→8 KB, 1→16 KB, 2→32 KB, 3→64 KB, 4→128 KB, 2→56 KB, 6→512 KB and 7→1024 KB. In FIG. 10B, the maximum A-MPDU length field is defined to accept another set of values such as 0→8 KB, 1→16 KB, 2→32 KB, 3→64 KB, 4→128 KB, 5→256 KB, 6→512 KB and 7→716 KB.

For certain aspects, the maximum A-MSDU length field may include the following A-MSDU length bits: 00: 3839, 01: 7935, 10: 11450 and 11: 16127, 15871 or 11195 Bytes. The MSDU length bit may be set to either zero or one to indicate MSDU max length equal to current value of 2304 bytes or 9000 bytes, respectively.

Figure 11:
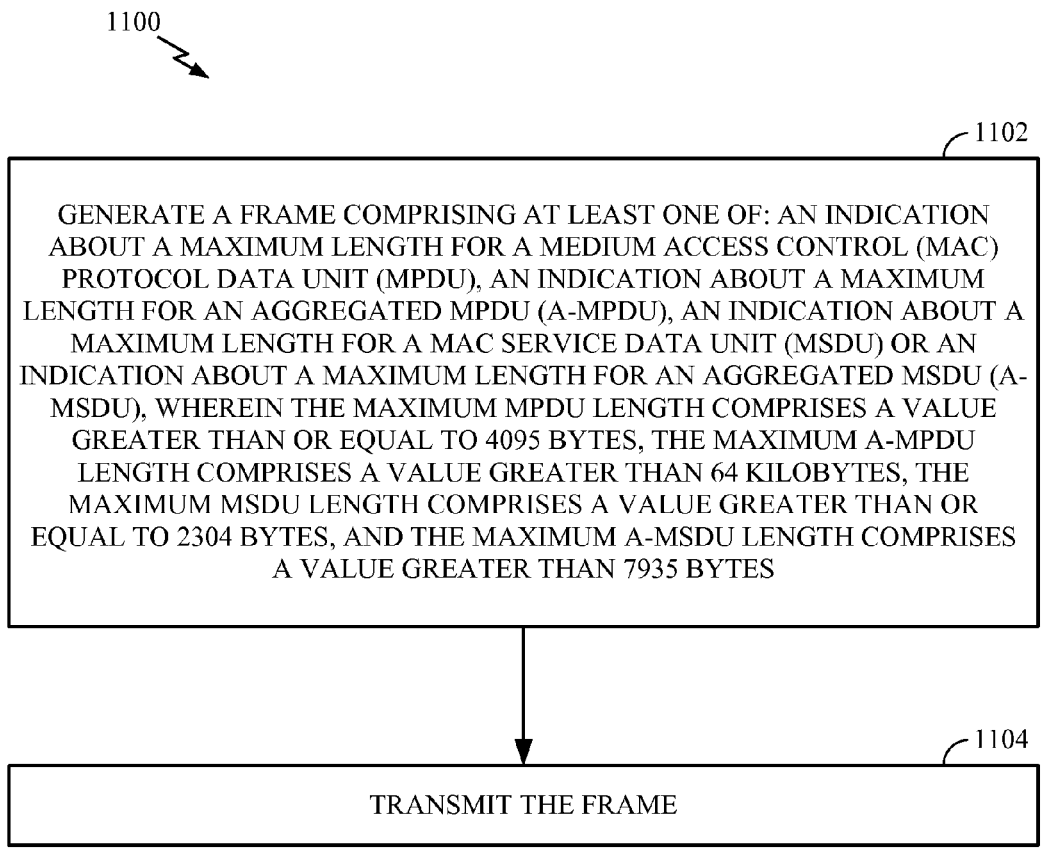
FIG. 11 illustrates example operations for signaling extended MPDU, A-MPDU and A-MSDU frame formats, in accordance with certain aspects of the present disclosure.

FIG. 11 illustrates example operations 1100 for signaling extended MPDU, A-MPDU and A-MSDU frame formats that may be performed by a wireless node (e.g., an access point), in accordance with certain aspects of the present disclosure.

At 1102, a frame may be generated comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than or equal to 4095 bytes, the maximum A-MPDU length comprises a value greater than 64 kilobytes and the maximum A-MSDU length comprises a value greater than 7935 bytes. For certain aspects, a MPDU length may be negotiable, and the MPDU length may be selected from one or more values that are less than or equal to the indicated maximum MPDU length value. At 1104, the frame may be transmitted to a receiver.

Figure 12:
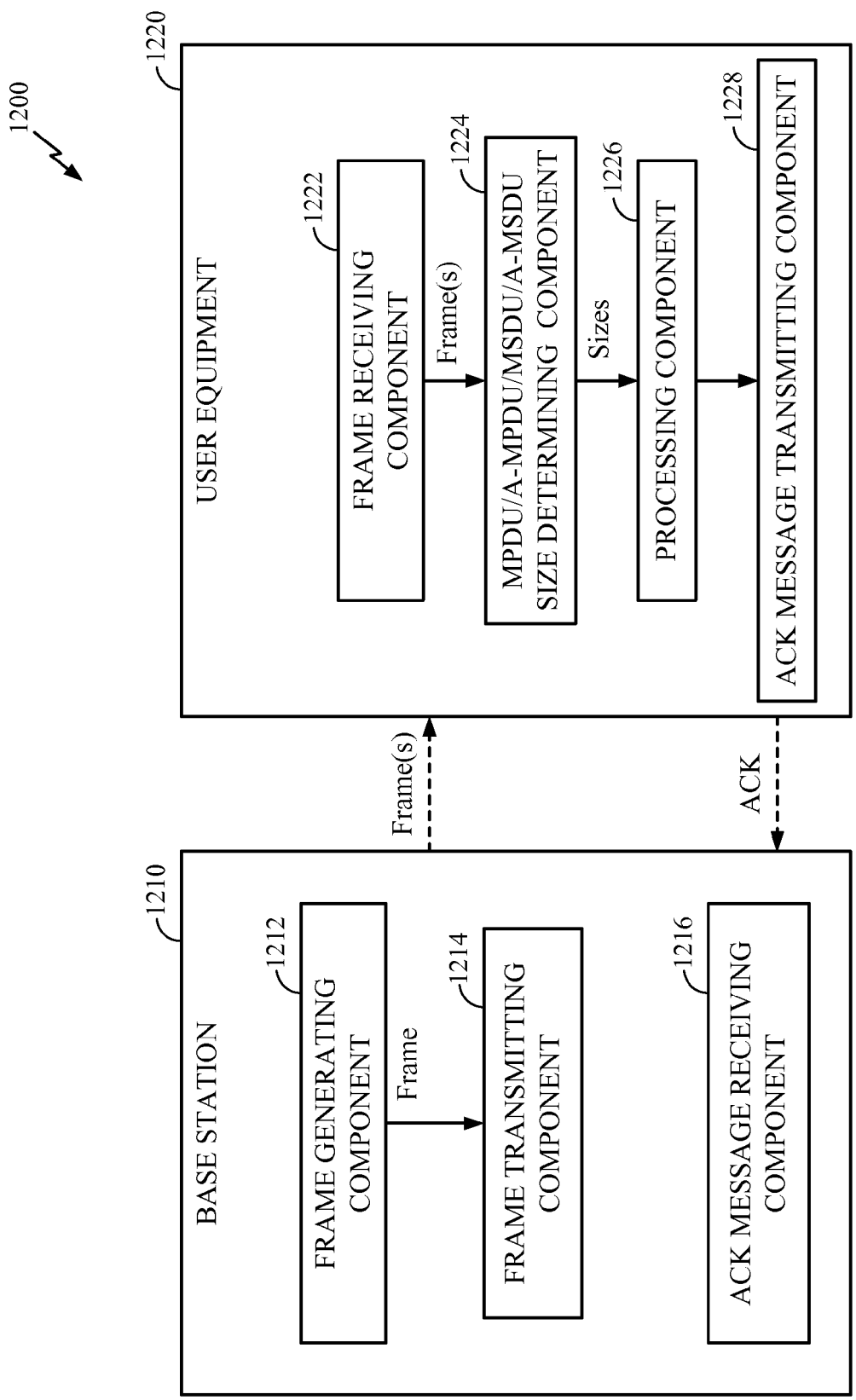
FIG. 12 illustrates an example network comprising a base station and a user equipment, in accordance with certain aspects of the present disclosure.

FIG. 12 illustrates example network 1200 comprising a base station and a user equipment, in accordance with certain aspects of the present disclosure. The base station 1210 may generate a frame structure utilizing the frame generating component 1212 and transmit the frame to the user equipment 1220 using the frame transmitting component 1214. The UE receives the frame using the frame receiving component 1222 and determines maximum sizes for at least one of the MPDU, A-MPDU, MSDU, or A-MSDU using the MPDU/A-MPDU/MSDU/A-MSDU size determining component 1224. The UE may then process the received frame utilizing the determined size(s) in the processing component 1226. If the frame is received correctly, the UE may send an acknowledgement message to the base station utilizing the ACK message transmitting component 1228. The base station receives the ACK message utilizing the ACK message receiving component 1216, and decides the same frame or another frame are to be transmitted in the next time slot.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

For certain aspects, means for receiving comprises a receiver, means for transmitting comprises a transmitter, means for generating a frame structure comprises a circuit configured to generate the frame structure and means for determining a maximum value comprises a circuit configured to determine the maximum value.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
a circuit configured to generate a frame comprising a very high throughput (VHT) capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using three bits in the VHT capability element; and
a transmitter configured to transmit the frame.

2. The apparatus of claim 1, wherein the maximum MPDU length comprises 11450 or 16383 bytes.

3. The apparatus of claim 1, wherein the maximum A-MPDU length comprises 512 or 1024 kilobytes.

4. The apparatus of claim 1, wherein the maximum A-MSDU length comprises 11195, 11450, 16127 or 15871 bytes.

5. The apparatus of claim 1, wherein a MPDU length is negotiable, and the MPDU length may be selected from one or more values that are less than or equal to the indicated maximum MPDU length value.

6. The apparatus of claim 1, wherein the maximum MPDU length is determined based on the maximum A-MSDU length.

7. A method for wireless communications, comprising:
generating a frame comprising a very high throughput (VHT) capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using three bits in the VHT capability element; and
transmitting the frame.

8. The method of claim 7, wherein the maximum MPDU length comprises 11450 or 16383 bytes.

9. The method of claim 7, wherein the maximum A-MPDU length comprises 512 or 1024 kilobytes.

10. The method of claim 7, wherein the maximum A-MSDU length comprises 11195, 11450, 16127 or 15871 bytes.

11. The method of claim 7, wherein a MPDU length is negotiable, and the MPDU length may be selected from one or more values that are less than or equal to the indicated maximum MPDU length value.

12. The method of claim 7, wherein the maximum MPDU length is determined based on the maximum A-MSDU length.

13. An apparatus for wireless communications, comprising:
means for generating a frame comprising a very high throughput (VHT) capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using three bits in the VHT capability element; and
means for transmitting the frame.

14. The apparatus of claim 13, wherein the maximum MPDU length comprises 11450 or 16383 bytes.

15. The apparatus of claim 13, wherein the maximum A-MPDU length comprises 512 or 1024 kilobytes.

16. The apparatus of claim 13, wherein the maximum A-MSDU length comprises 11195, 11450, 16127 or 15871 bytes.

17. The apparatus of claim 13, wherein a MPDU length is negotiable, and the MPDU length may be selected from one or more values that are less than or equal to the indicated maximum MPDU length value.

18. The apparatus of claim 13, wherein the maximum MPDU length is determined based on the maximum A-MSDU length.

19. A computer-program product for wireless communications, comprising a non-transitory computer-readable medium comprising instructions executable for:
generating a frame comprising a very high throughput (VHT) capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using three bits in the VHT capability element; and
transmitting the frame.

20. An access point for wireless communications, comprising:
at least one antenna;
a circuit configured to generate a frame comprising a very high throughput (VHT) capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using three bits in the VHT capability element; and
a transmitter configured to transmit the frame via the at least one antenna.

21. The apparatus of claim 1, wherein the circuit is further configured to generate the frame having a very high throughput (VHT) capability element therein in compliance with the Institute for Electrical and Electronics Engineers (IEEE) 802.11 standard.

22. The apparatus of claim 21, wherein one or more bits in the VHT capability element are utilized to signal a negotiable maximum MPDU length value.

23. The method of claim 7, wherein generating the frame comprises including a very high throughput (VHT) capability element in the frame in compliance with the Institute for Electrical and Electronics Engineers (IEEE) 802.11 standard.

24. The method of claim 23, wherein one or more bits in the VHT capability element are utilized to signal a negotiable maximum MPDU length value.

25. The apparatus of claim 13, wherein the means for generating is configured to generate the frame having a very high throughput (VHT) capability element therein in compliance with the Institute for Electrical and Electronics Engineers (IEEE) 802.11 standard.

26. The apparatus of claim 25, wherein one or more bits in the VHT capability element are utilized to signal a negotiable maximum MPDU length value.

27. An apparatus for wireless communications, comprising:
a circuit configured to generate a frame comprising a capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using a plurality of bits in the capability element; and
a transmitter configured to transmit the frame.

28. The apparatus of claim 27, wherein the plurality of bits in the capability element comprises more than two bits.

29. The apparatus of claim 27, wherein the plurality of bits are being used to signal a negotiable maximum MPDU length value.

30. A method for wireless communications, comprising:
generating a frame comprising a capability element comprising at least one of: an indication about a maximum length for a Medium Access Control (MAC) Protocol Data Unit (MPDU), an indication about a maximum length for an Aggregated MPDU (A-MPDU) or an indication about a maximum length for an Aggregated MAC Service Data Unit (A-MSDU), wherein the maximum MPDU length comprises a value greater than 8191 bytes, the maximum A-MPDU length comprises a value greater than 256 kilobytes, and the maximum A-MSDU length comprises a value greater than 7935 bytes and the indication about the maximum A-MPDU length is expressed as a maximum A-MPDU length exponent field using a plurality of bits in the capability element; and
transmitting the frame.

31. The method of claim 30, wherein the plurality of bits in the capability element comprises more than two bits.

32. The method of claim 30, wherein the plurality of bits are being used to signal a negotiable maximum MPDU length value.

* * * * *